United States Patent [19]

Sanders et al.

[11] Patent Number: 4,536,987
[45] Date of Patent: Aug. 27, 1985

[54] FISHING LURE

[76] Inventors: Clifford Sanders; Joanne Sanders, both of Box 114, Whaletown, B.C., Canada, V0P 1K0

[21] Appl. No.: 536,657

[22] Filed: Sep. 28, 1983

[30] Foreign Application Priority Data

Oct. 19, 1982 [CA] Canada .................................. 413762

[51] Int. Cl.³ ............................................. A01K 85/00
[52] U.S. Cl. .................................... 43/42.34; 43/42.45
[58] Field of Search .................. 43/42.45, 42.34, 42.48, 43/42.03, 42.33

[56] References Cited

U.S. PATENT DOCUMENTS

| D. 169,816 | 6/1953 | Kirkman | 43/42.48 |
|---|---|---|---|
| 205,226 | 6/1866 | Guardia . | |
| 230,592 | 3/1874 | Davis | 22/27 |
| 1,193,077 | 8/1916 | Schoonmaker | 43/42.45 |
| 1,777,004 | 9/1930 | Lemere | 43/42.34 |
| 2,038,127 | 4/1936 | Pflueger | 43/42.45 |
| 2,303,097 | 11/1942 | Townsend | 43/42.34 |
| 2,338,577 | 1/1944 | Divine | 43/42.34 |
| 2,624,147 | 1/1953 | Round | 43/42.34 |
| 3,299,561 | 1/1967 | Desbois | 43/42.09 |
| 3,344,549 | 10/1967 | Peters et al. | 43/42.11 |
| 3,360,882 | 1/1968 | Belokin | 43/42.33 |
| 3,367,060 | 2/1968 | Abercrombie | 43/42.33 |

FOREIGN PATENT DOCUMENTS 2422328 11/1979 France .
184295 6/1963 Sweden ............................ 43/42.47

Primary Examiner—Gene P. Crosby
Attorney, Agent, or Firm—Holman & Stern

[57] ABSTRACT

A fishing lure comprising a body which simulates a fish, to which the fishing line and hook are attached and a substantial recess disposed on each side of the body, extending longitudinally of the body from behind the head portion of the lure to the tail portion of the lure, which recess has side walls with planes extending at an obtuse angle to the plane of the base of the recess and to the surface of the body. Such recesses provide the lure with an improved motion and action as it is pulled through the water, making the lure more attractive to predatory fish and, particularly to the larger predatory fish.

10 Claims, 5 Drawing Figures

FISHING LURE

BACKGROUND OF THE INVENTION

1. Field of the Invention

The present invention relates to a fishing lure for use in catching fish, particularly the larger fish such as salmon, bass, halibut, walleyes, red snapper and lung cod, which fishing lure is primarily intended for use as a jigging lure, but may also be used as a lure in mooching, casting and trawling.

2. Description of the Prior Art

It is well-known that the primary function of a fishing lure is to undergo a motion and action as it is pulled or jigged through the water, which simulates the action of inter alia small fish, which action would thus be attractive to predatory fish, such that the predatory fish snap at the lure and are thus caught by the hook attached to the lure.

Lures have heretofore bee designed to obtain improved motion through the water, which is more attractive to predatory fish than the known lures. The present invention provides a fishing lure which is primarily intended as a jigging lure, but may be used as a lure in mooching, casting or trawling, which has an action which is superior to conventional lures, which action may be described generally as a wobble and is highly attractive to predatory fish, such as to improve the effectiveness of the lure in attracting and catching fish.

BRIEF SUMMARY OF THE INVENTION

According to the present invention therefore there is provided in a fishing lure, comprising a body simulating a fish, having at a head portion thereof means for attachment to a fishing line and at a tail portion thereof hook means for hooking the fish, the improvement in which the body has on each side thereof a substantial recess having side walls with planes extending at an obtuse angle to the plane of the base of the recess and to the surface of the body, whereby to provide the lure with an improved moton and action as it is pulled through the water, making the lure more attractive to predatory fish.

The presence of a substantial recess in both sides of the fish is a critical feature of the present invention as the longitudinal edges of the recesses each provide two planes disposed at an obtuse angle to the base of the recess, particularly at an angle of about 135°, which is contacted by the water and contributes greatly to the action of the lure as it passes through the water. The angle may, of course, be increased or decreased, depending upon the depth of the recess and the size of the lure. Suitably, the depth of the recess is at least about one and preferably at least two millimeters.

The length and width of the recess are again important for the action of the lure, to provide a surface area of the base of the recess, which is as great as possible. As the area of the base of the recess is reduced, the desired effect of the recess on the action of the lure is weakened. By following the contours of the body of the fish, provides for the widest recess possible, along the body of the fish. Thus, as the body of the fish broadens towards the head, so does the recess. Thus, the best way to obtain the most surface for the base of the recess is to follow the contours of the body of the fish. The action of the lure is subject to the current of water through which it is being pulled and the motion used by the fisherman. The recess creates a plane on which the currents of water can act, simulating action attractive to larger fish and is generally a type of wobble action. The body of the fish may simulate the shape of any small fish, such as a minnow, achieving the same effect with the recess in accordance with the present invention.

In a particularly desirable embodiment of the present invention the base of the recess is suitably covered with a high light reflecting surface, particularly, a conventional multi-faceted effect surface and also serves for further attraction of the fish.

In a still further embodiment of the present invention, the body of the fish in the longitudinal direction may be C-shaped, S-shaped or arcuately L-shaped, which shapes again add to the motion of the fish as it passes through the water, making it more attractive to predatory fish, and therefore, more effective as a lure. In particular, the C-shaped and L-shaped lures are particularly useful for horizontal jigging from a drifting boat and the S-shaped lure is useful for casting and trawling from a drifting boat or from the shore. The lure provides a quick fluttering, tumbling erratic action due to these shapes.

In the manufacture of the lure of the present invention the aforesaid bends are supplied to the body of the fish before painting and a ceramic finish enamel is desirably used, which prebending of the body of the fish lessens the chance of cracking which occurs with conventional lures which are bent by the fisherman.

BRIEF DESCRIPTION OF THE DRAWINGS

The present invention will be further described with reference to the accompanying drawings in which.

DETAILED DESCRIPTION

Figure 1:
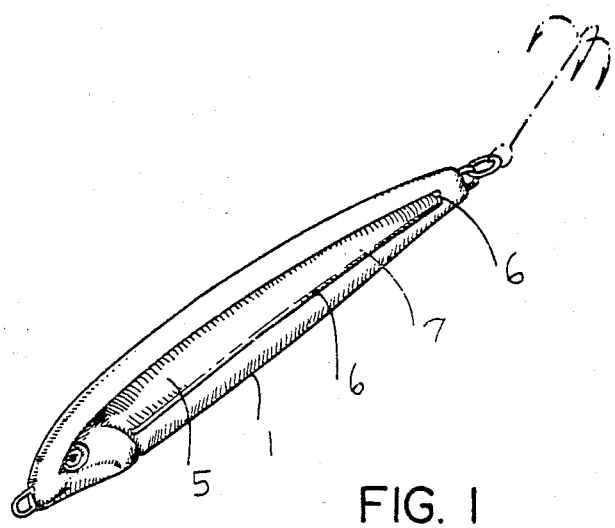
FIG. 1 is a perspective view of the lure in accordance with one embodiment of the present invention.

Referring to the figures, the lure, which is a 2½ ounce lure, comprises a body 1 with a ring 2 attached to a head portion thereof for attachement of the fishing line and a fish hook 3 attached by a ring 4 to a tail portion thereof. Extending from the head to the tail portion on each side of the body 1 is a recess 5 which has side walls and end walls 6 which are at an obtuse angle with respect to the base 7 of the recess and the surface of the body 1. The recess 5 generally follows the contours of the body 1 and is wider at the head portion than the tail portion. The recess has a high light reflecting multifaceted surface on the base 7.

Figures 2, 3, 4:
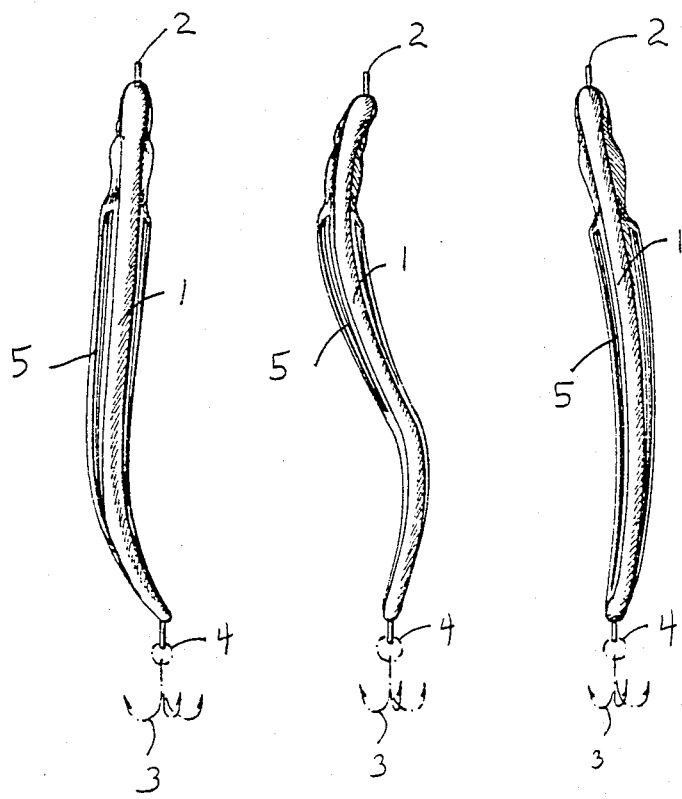
FIGS. 2, 3 and 4 are plan views of different configurations of the lure of FIG. 1.
Figure 5:
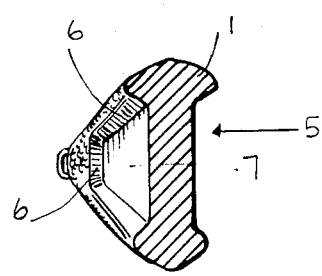
FIG. 5 is a cross section through the body of the lure of FIG. 1.

As seen from FIGS. 2, 3 and 4, the body 1 may in plan have an arcuate L-shape, S-shape or C-shape to enhance the motion of the lure through the water.

We claim:

1. In a jigging lure having a body simulating a fish, at a head portion thereof means for attachment to a fishing line and, at a tail portion thereof hook means for hooking the fish, the improvement comprising; an identical recess disposed symmetrically on each side of the body extending longitudinally of the body from behind the head portion to the tail portion, said recess having a flat planar base and surrounding side walls extending at an obtuse angle from the base and to the side surface of the body, whereby to provide the lure with an improved motion and acton as it is jerked or jigged through the water, making the lure more attractive to predatory fish.

2. A lure as claimed in claim 1 in which the walls of the recess generally follow peripheral contours of the body to provide a maximum area for the base of the recess, said base being wider at the head portion than at the tail portion.

3. A lure as claimed in claim 2 in which the length to width ratio of the recess is from about 8 to 12 to 1.

4. A lure as claimed in claim 3 in which the depth of the recess is at least two mm.

5. A lure as claimed in claim 1, in which the obtuse angle with the base of the recess is about 135°.

6. A lure as claimed in claim 1, in which the base of the recess has a high light reflecting surface.

7. A lure as claimed in claim 1, in which the base of the recess has a high light reflecting surface which is a multi-faceted effect surface.

8. A lure as claimed in claim 1, in which the body is longitudinally C-shaped.

9. A lure as claimed in claim 1, in which the body is longitudinally S-shaped.

10. A lure as claimed in claim 1, in which the body is longitudinally arcuately L-shaped.

* * * * *